United States Patent
Chu

(10) Patent No.: US 9,752,489 B2
(45) Date of Patent: Sep. 5, 2017

(54) CONNECTOR FOR COUPLING EXHAUST MANIFOLD WITH TURBOCHARGER HOUSING

(71) Applicants: Hyundai Motor Company, Seoul (KR); Kia Motors Corp., Seoul (KR)

(72) Inventor: Dong Ho Chu, Ansan-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 443 days.

(21) Appl. No.: 14/313,855

(22) Filed: Jun. 24, 2014

(65) Prior Publication Data
US 2015/0098815 A1    Apr. 9, 2015

(30) Foreign Application Priority Data

Oct. 8, 2013 (KR) ................. 10-2013-0120199

(51) Int. Cl.
F01N 13/10 (2010.01)
F02B 37/02 (2006.01)
F01N 13/18 (2010.01)
F02B 67/10 (2006.01)

(52) U.S. Cl.
CPC .......... *F01N 13/10* (2013.01); *F01N 13/102* (2013.01); *F01N 13/1805* (2013.01); *F02B 37/02* (2013.01); *F02B 37/025* (2013.01); *F02B 67/10* (2013.01); *Y02T 10/144* (2013.01)

(58) Field of Classification Search
CPC ...... F01N 13/10; F01N 13/1805; F01N 13/18; F01N 2260/10; F02B 37/02; F01D 25/243
See application file for complete search history.

(56) References Cited

U.S. PATENT DOCUMENTS

| | | | |
|---|---|---|---|
| 3,043,094 A * | 7/1962 | Nichols | F01N 13/102 181/240 |
| 8,183,494 B2 | 5/2012 | Bien et al. | |
| 2007/0289954 A1 | 12/2007 | Bien et al. | |
| 2009/0158724 A1* | 6/2009 | Muller | F01N 13/102 60/323 |
| 2009/0200795 A1 | 8/2009 | Riekers et al. | |
| 2010/0038901 A1* | 2/2010 | Schmidt | F01N 13/102 285/294.1 |
| 2012/0235407 A1* | 9/2012 | Blackie | F01N 13/102 285/398 |
| 2013/0302158 A1* | 11/2013 | Tschirschke | F01N 13/10 415/214.1 |
| 2015/0240697 A1* | 8/2015 | Smith | F01N 13/1805 60/598 |

(Continued)

FOREIGN PATENT DOCUMENTS

DE      102 28 485 A1    1/2004
EP      1 538 314 A1     6/2005

(Continued)

*Primary Examiner* — Patrick Maines
(74) *Attorney, Agent, or Firm* — Morgan, Lewis & Bockius LLP

(57) ABSTRACT

A connector for coupling an exhaust manifold with a turbocharger housing may include a manifold coupling part coupled with the exhaust manifold, a housing coupling part integrally coupled with an end of the manifold coupling part and coupled with the turbocharger housing, and a plurality of exhaust gas paths penetrating through the manifold coupling part and the housing coupling part.

5 Claims, 5 Drawing Sheets

(56) References Cited

U.S. PATENT DOCUMENTS

2015/0267597 A1\* 9/2015 Fischer ................ F01N 13/143
                                                                    60/323

FOREIGN PATENT DOCUMENTS

| | | | |
|---|---|---|---|
| JP | 2000-18032 A | | 1/2000 |
| JP | 2000018032 A | \* | 1/2000 |
| JP | 2002-161741 A | | 6/2002 |
| JP | 2004-225651 A | | 8/2004 |
| JP | 2004225651 A | \* | 8/2004 |
| JP | 2010-522304 A | | 7/2010 |
| KR | 10-0794018 B1 | | 1/2008 |
| WO | WO 2010/019268 A1 | | 2/2010 |

\* cited by examiner

CONNECTOR FOR COUPLING EXHAUST MANIFOLD WITH TURBOCHARGER HOUSING

CROSS REFERENCE TO RELATED APPLICATION

The present application claims priority to Korean Patent Application No. 10-2013-0120199, filed on Oct. 8, 2013, the entire contents of which is incorporated herein for all purposes by this reference.

BACKGROUND OF THE INVENTION

Field of the Invention

The present invention relates to a connector for coupling an exhaust manifold with a turbocharger housing.

Description of Related Art

Generally, as shown in FIG. 1, in a vehicle including a turbocharger, a structure for coupling an exhaust manifold with a turbocharger housing is mainly manufactured in an integrated type to cope with a complicated shape of an exhaust manifold 1 and to maintain a sealing with the exhaust manifold 1 and a turbocharger housing 2.

However, as exhaust gases discharged from each of the runners 1a, 1b, 1c, and 1d of the exhaust manifold 1 interfere with each other at a joint portion 3 of the exhaust gases, the integrated structure as described above has disadvantages, such as reduction in a flow coefficient of exhaust gas, reduction in efficiency of the turbocharger, reduction in engine performance, and the like.

In particular, when the turbocharger of a twin scroll is applied, in order to avoid the interference of the exhaust gases, the No. 1 runner and the No. 4 runner 1a and 1d and the No. 2 runner and the No. 3 runner 1b and 1c of the exhaust manifold 1 are each joined at the joint part 3 through one passage, in which as fatigability of a corner and a central portion of a barrier rib part at which passages are joined is increased due to the complicated shape of the joint portion and the increase in thermal fatigue in response to a temperature gradient inside and outside thereof, the joint part 3 may be damaged.

To avoid the interference at the time of joining the exhaust gases while supplementing the above disadvantages, a technology of coupling the exhaust manifold 1 with the turbocharger housing 2 by using a connector 10 as illustrated in FIG. 2 has proposed.

However, as illustrated in FIG. 2, the connector 10 according to the related art has a structure in which a plurality of components, that is, a connector housing 11, an upper plate 12 provided with a passage 12a, and a plate cover 13 are welded to each other to be formed as one component, which is lead to the increase in cost due to the excessive number of components, the reduction in convenience and productivity due to the assembly of components 11, 12, and 13, the reduction in durability due to the welding of the components 11, 12, and 13, and the like.

In particular, the connector 10 according to the related art as described above has a structure to merely consider the interference avoidance of exhaust gas, but has a structure which does not consider absorption of fatigability due to a thermal load, efforts to reduce a stress by reducing temperature, and the like. Therefore, the connector 10 according to the related art does not improve the fatigability due to a high-temperature exhaust gas, such that the connector 10 may have the reduced durability and may be easily damaged.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a connector for coupling an exhaust manifold with a turbocharger housing capable of increasing a flow coefficient and efficiency of the turbocharger, and engine performance by avoiding interference of exhaust gases, in particular, reducing stress and increasing durability due to absorption of fatigability and reduction in temperature by high-temperature exhaust gas heat.

In an aspect of the present invention, a connector for coupling an exhaust manifold with a turbocharger housing, may include a manifold coupling part coupled with the exhaust manifold, a housing coupling part integrally coupled with an end of the manifold coupling part and coupled with the turbocharger housing, and a plurality of exhaust gas paths penetrating through the manifold coupling part and the housing coupling part.

The housing coupling part protrudes outwardly from the manifold coupling part, wherein an outer stepped surface is formed between the manifold coupling part and the housing coupling part, the outer stepped surface contacting the exhaust manifold.

An end of the housing coupling part is formed to an outer edge more protruding outwards than the exhaust gas path, wherein an inner stepped surface is disposed between the exhaust gas path and the outer edge, and wherein the inner stepped surface is provided with at least two exhaust gas paths which are spaced apart from each other.

The exhaust gas paths may have a circular shape or an oval shape without a notch so as not to affect a flow of exhaust gas.

An outer side of the housing coupling part is integrally provided with a plurality of outer grooves so as to reduce a temperature of the exhaust gas by increasing heat exchange depending on an increase in a surface area.

The manifold coupling part is inserted into a space part between an inskin and an outskin of the exhaust manifold, wherein the inskin is welded to an inner circumferential surface of the exhaust gas path in a contact state therebetween, and wherein the outskin is welded to an outer surface of the manifold coupling part in a contact state therebetween and an end of the outskin is coupled with the outer stepped surface in a contact state therebetween.

The turbocharger housing is integrally provided with a housing protrusion which is inserted into the inner stepped surface of the housing coupling part, wherein the outer edge of the housing coupling part is welded to an outer surface of the housing protrusion in a contact state therebetween and an end of the outer edge is coupled with a stepped surface of the turbocharger housing in a contact state therebetween.

The inner stepped surface is provided with a plurality of stepped surface holes for relaxing stress concentration and reducing a weight by reducing a deviation in thickness between the exhaust gas paths so as to integrally penetrate through the housing coupling part and the manifold coupling part.

A clearance for absorbing a deformation due to a thermal load of a high-temperature exhaust gas is formed between the inner stepped surface of the housing coupling part and the housing protrusion of the turbocharger housing.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
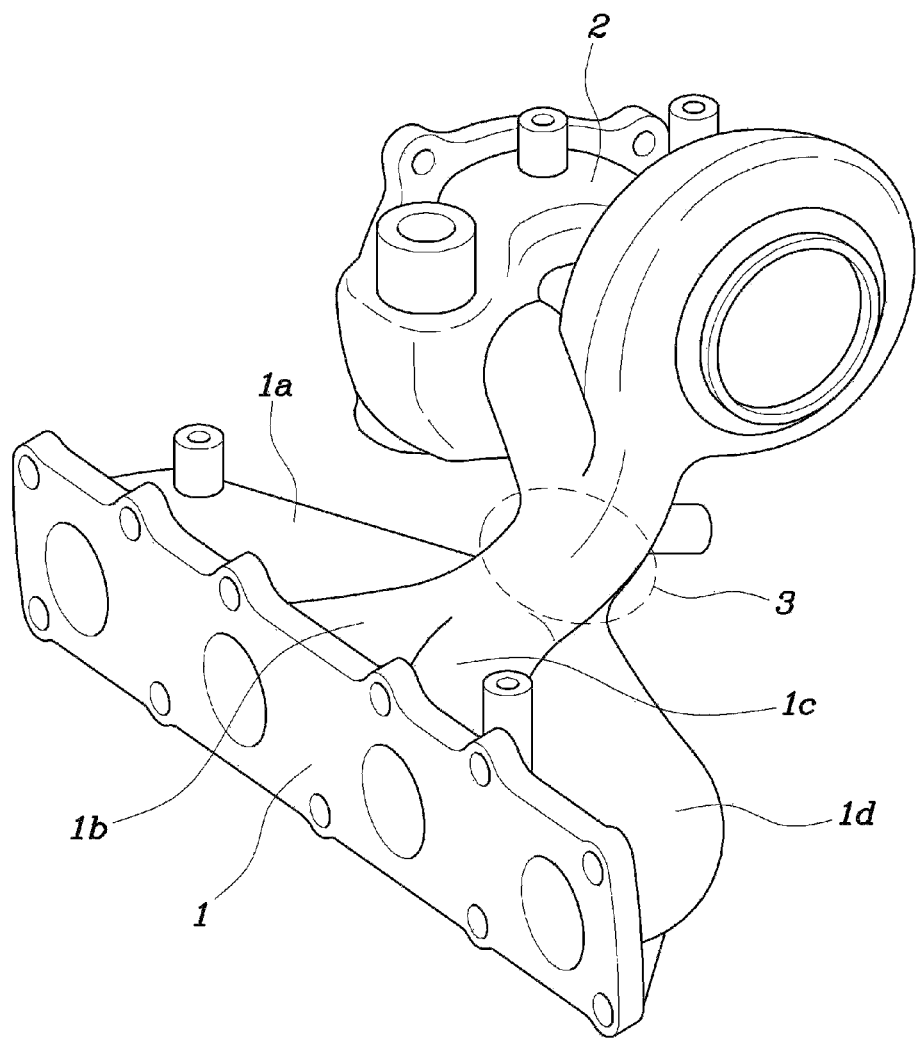
FIG. 1 is a diagram illustrating a conventional structure in which an exhaust manifold and a turbocharger housing are integrated.
Figure 2:
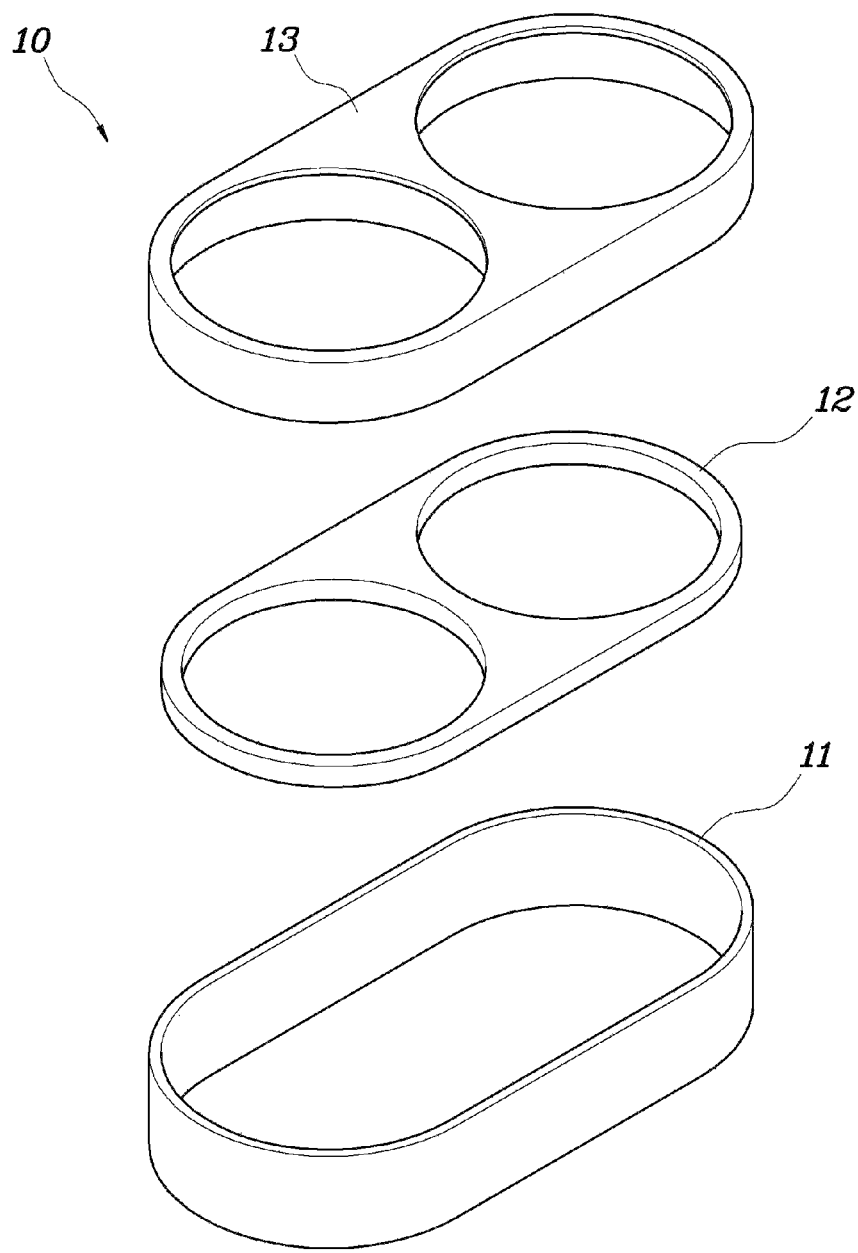
FIG. 2 is a diagram illustrating a connector for coupling the exhaust manifold with the turbocharger housing according to the conventional structure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a connector for coupling an exhaust manifold with a turbocharger housing according to an exemplary embodiment of the present invention will be described with reference to the accompanying drawings.

Figure 3:
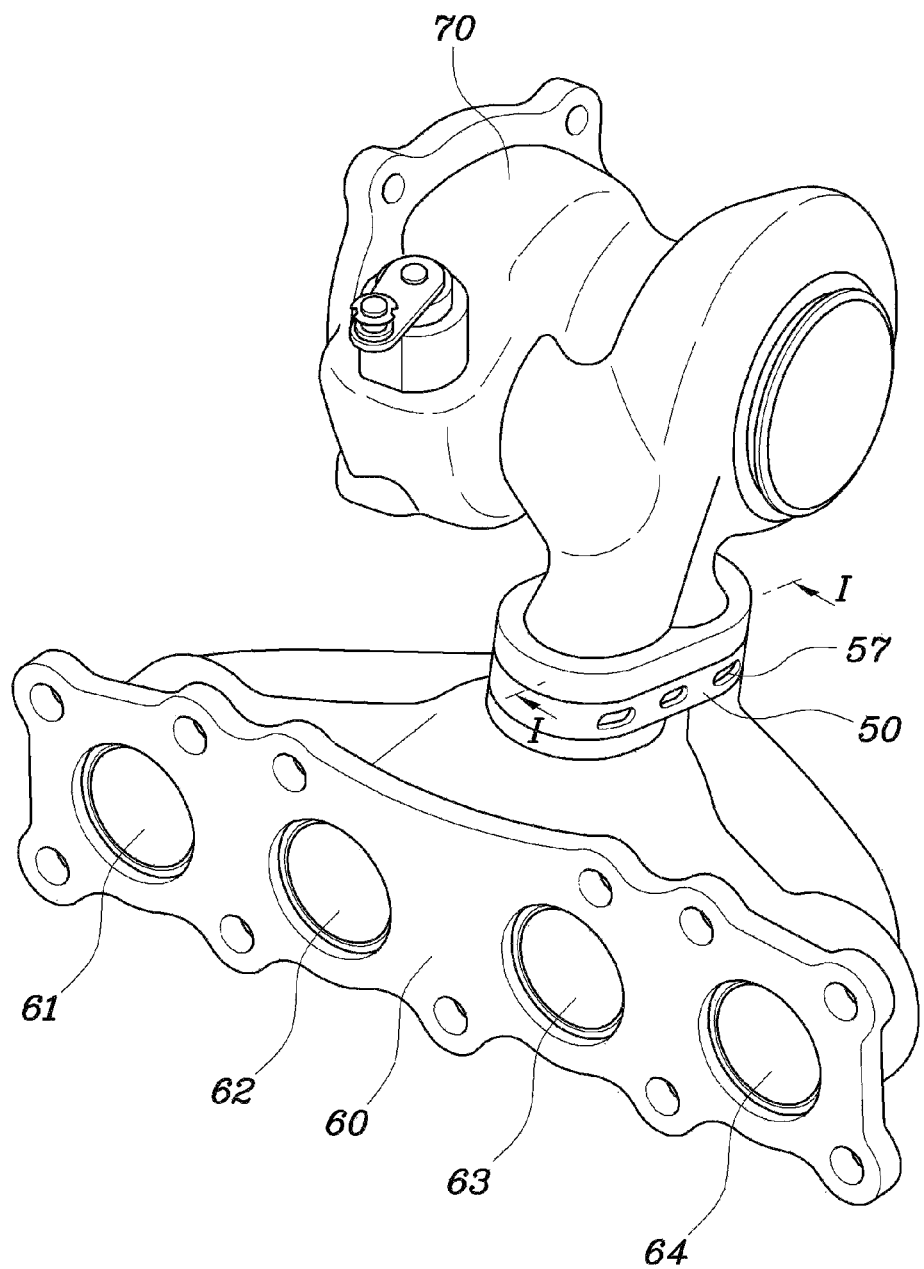
FIG. 3 is a diagram illustrating a state in which the exhaust manifold and the turbocharger housing are coupled with each other by using the connector according to an exemplary embodiment of the present invention.
Figure 4:
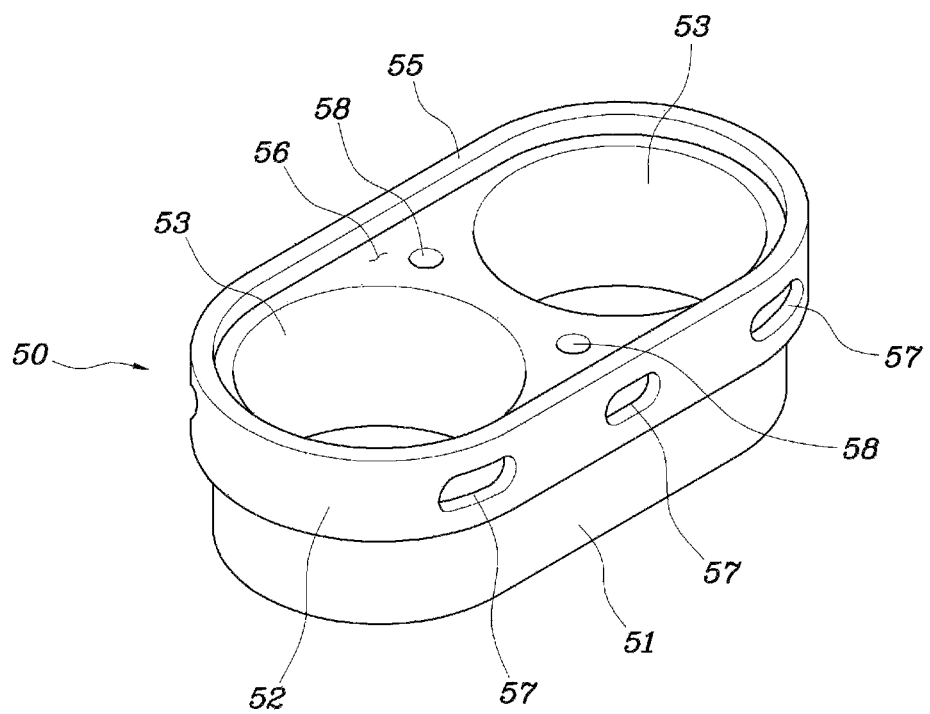
FIG. 4 is a perspective view of the connector for coupling the exhaust manifold with the turbocharger housing according to the exemplary embodiment of the present invention.
Figure 5:
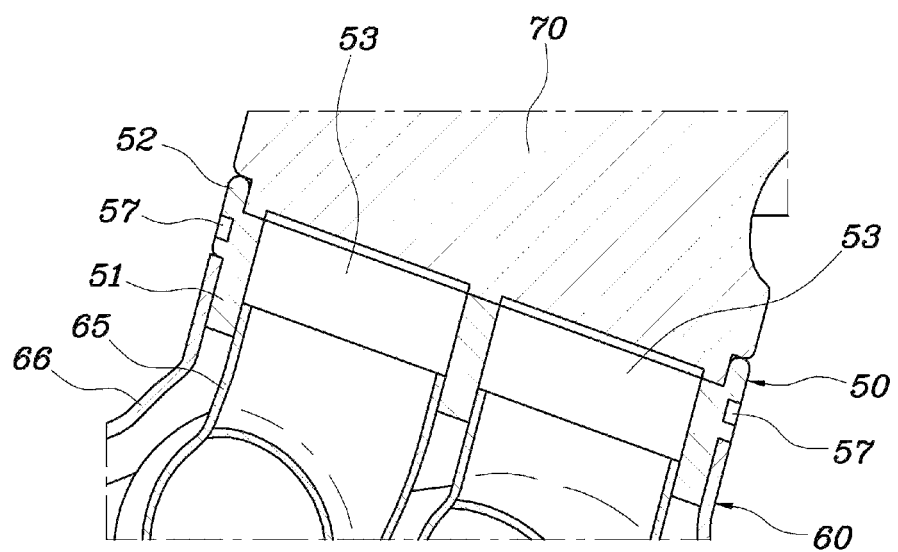
FIG. 5 is a cross-sectional view taken along the line I-I of FIG. 3.
Figure 6:
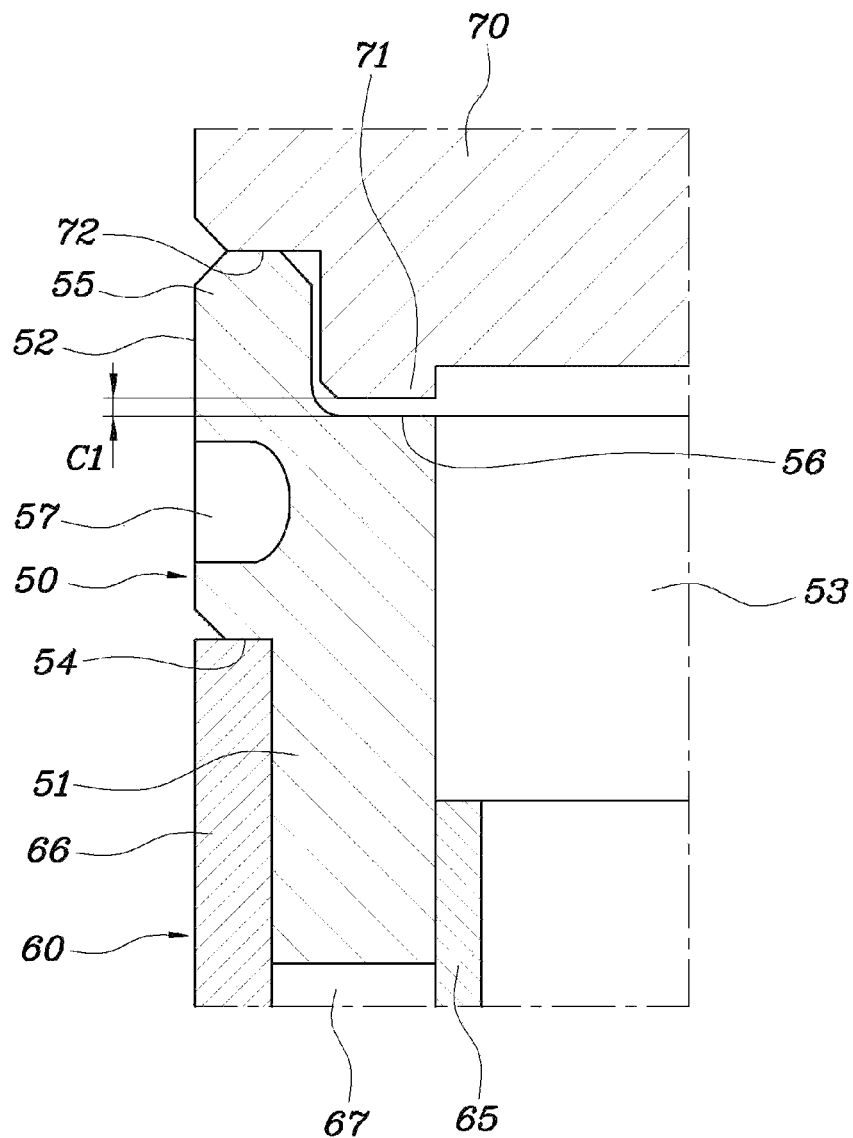
FIG. 6 is an enlarged cross-sectional view of a coupling portion of the connector of FIG. 5.

As illustrated in FIGS. 3 to 6, a connector 50 according to an exemplary embodiment of the present invention is to couple an exhaust manifold 60 with a turbocharger housing 70 in a vehicle in which a turbocharger is mounted and is formed so that an appearance of the connector 60 has an oval shape.

The connector 50 is configured to include a manifold coupling part 51 coupled with the exhaust manifold 60, a housing coupling part 52 integrally coupled with one end of the manifold coupling part 51 and coupled with a turbocharger housing 70, and a plurality of exhaust gas paths 53 penetrating through the manifold coupling part 51 and the housing coupling part 52.

That is, since the connector 50 according to the exemplary embodiment of the present invention has a monolithical structure, the connector 50 more reduces the number of components than the conventional connector having a 3 piece structure, thereby saving costs, reducing a weight, improving convenience of assembly, improving productivity, increasing durability, and the like.

When a four cylinder engine and a turbocharger of a twin scroll type are applied, the No. 1 runner 61 and the No. 4 runner 64 of the exhaust manifold 60 are joined at one passage and the No. 2 runner 62 and the No. 3 runner 63 are joined at another passage so as to avoid the interference of exhaust gases, in which the exhaust gas path 53 of the connector 50 is formed in two so that the passage in which the No. 1 and No. 4 runners 61 and 64 of the exhaust manifold 60 are joined is coupled with the passage in which the No. 2 runner and the No. 3 runner 62 and 63 are joined.

According to the exemplary embodiment of the present invention, the housing coupling part 52 is formed to protrude outside from the manifold coupling part 51 and as the housing coupling part 52 is formed to protrude outside from the manifold coupling part 51 as described above, an outer surface on which the manifold coupling part 51 is coupled with the housing coupling part 52 is integrally provided with an outer stepped surface 54 contacting the exhaust manifold 60.

The manifold coupling part 51 is mounted to be inserted into a space part 67 between an inskin 65 and an outskin 66, in which the inskin 65 is welded to an inner circumferential surface of the exhaust gas path 53 in a contact state therebetween, the outskin 66 is welded to an outer surface of the manifold coupling part 51 in a contact state therebetween, and an end of the outskin 66 is coupled with the outer stepped surface 54 in a contact state therebetween.

That is, as the outer stepped surface 54 of the manifold coupling part 51 contacts the end of the outskin 66 of the exhaust manifold 60, the connector 50 according to the exemplary embodiment of the present invention is more stably mounted.

The end of the housing coupling part 52 is disposed at an outer edge 55 more protruding than the exhaust gas path 53 and an inner stepped surface 56 is disposed between the exhaust gas path 53 and the outer edge 55 by the outer edge 55 formed as described above.

The exhaust gas path 53 according to the exemplary embodiment of the present invention has a structure in which the two inner stepped surfaces 56 are spaced apart from each other.

Meanwhile, the turbocharger housing 70 is integrally provided with a housing protrusion 71 which is inserted into the inner stepped surface 56 of the housing coupling part 52 and the turbocharger housing 70 is provided with a stepped surface 72 toward outside of the housing protrusion 71 by the housing protrusion 71 formed as described above.

Therefore, when the manifold coupling part 51 of the connector 50 is inserted into the space part 67 between the inskin 65 and the outskin 66 of the exhaust manifold 60, the outer edge 55 of the housing coupling part 52 of the connector 50 is welded to an outer surface of the housing protrusion 71 in a contact state therebetween. In this case, the end of the outer edge 55 is coupled with the stepped surface 72 of the turbocharger housing 70 in a contact state therebetween.

As described above, as the end of the outer edge 55 of the housing coupling part 52 contacts the stepped surface 72 of the turbocharger housing 70, the connector 50 according to the exemplary embodiment of the present invention is more stably mounted, in particular, a clearance C1 having a predetermined size may be formed between the inner stepped surface 56 of the housing coupling part 52 and the housing protrusion 71 of the turbocharger housing 70.

The clearance C1 becomes a space absorbing the deformation (thermal fatigue) when the housing protrusion 71 or the connector 50 is deformed due to the thermal load of high-temperature exhaust gas, such that the damage of the connector 50 due to the thermal fatigue may be prevented, thereby greatly increasing the durability of the connector 50.

The exhaust gas path 53 according to the exemplary embodiment of the present invention has a circular shape or an oval shape without a notch so as not to affect the flow of exhaust gas.

When the exhaust gas does not smoothly flow in the turbocharger due to protrusions such as the notch, the flow coefficient of the exhaust gas introduced into the turbocharger may be reduced, the efficiency of the turbocharger may be reduced, the engine performance may be reduced, and the like. To prevent the disadvantages, the exhaust gas path 53 according to the exemplary embodiment of the present invention preferably has the circular shape or the oval shape without the notch.

Further, in the connector 50 according to the exemplary embodiment of the present invention, the exhaust gas path 53 is a path in which the high-temperature exhaust gases are joined and when thermal fatigability due to the exhaust gases is not reduced, the durability of the connector 50 is largely weakened.

Therefore, since the exemplary embodiment of the present invention has the structure in which the outer surface of the housing coupling part 52 is provided with the plurality of outer grooves 57 contacting air, the contact surface area with air through the outer groove 57 is increased, such that the heat exchange may be increased to reduce the temperature of the exhaust gas, thereby reducing the stress and increasing the durability.

Further, since the present invention has a structure in which the inner stepped surface 56 is provided with the plurality of stepped surface holes 58, the stepped surface hole 58 has a structure formed to integrally penetrate through the housing coupling part 52 and the manifold coupling part 51, and the deviation in thickness between the exhaust gas paths 53 is reduced by the stepped surface hole 58 to relax the stress concentration due to the deviation in thickness, thereby improving the thermal stress due to the exhaust gas and reducing the weight.

As described above, as the connector 50 according to the exemplary embodiment of the present invention is formed to prevent the interference of exhaust gases when the exhaust gases discharged from each of the runners 61, 62, 63, and 64 of the exhaust manifold 60 are joined, such that the flow coefficient of the exhaust gas introduced into the turbocharger may be increased, thereby improving the efficiency of the turbocharger and the engine performance.

Further, the connector 50 according to the exemplary embodiment of the present invention has the 1 piece structure in which the manifold coupling part 51, the housing coupling part 52, and the plurality of exhaust gas paths 53 are integrally formed, thereby reducing the number of components, saving the costs, reducing the weight, improving the convenience of assembly, improving the productivity, increasing the durability, and the like.

Further, the connector 50 according to the exemplary embodiment of the present invention has a structure in which the outer stepped surface 54 of the manifold coupling part 51 is provided to contact the end of the outskin 66 of the exhaust manifold 60 and the end of the outer edge 55 of the housing coupling part 51 is provided to contact the stepped surface 72 of the turbocharger housing 70, such that the connector 50 according to the exemplary embodiment of the present invention may be more stably mounted.

Further, when the connector 50 according to the exemplary embodiment of the present invention is mounted to couple the exhaust manifold 60 with the turbocharger housing 70, the connector 50 has a structure in which the clearance C1 having a predetermined size is formed between the inner stepped surface 56 of the housing coupling part 52 and the housing protrusion 71 of the turbocharger housing 70. By the structure, when the housing protrusion 71 or the connector 50 is damaged due to the thermal load of the high-temperature exhaust gas, the clearance C1 absorbs the deformation (thermal fatigue), such that the damage of the connector 50 due to the thermal fatigue may be prevented, thereby greatly improving the durability of the connector 50.

Further, the connector 50 according to the exemplary embodiment of the present invention has the structure in which the exhaust gas path 53 has the circular shape or the oval shape without the notch so as not to affect the flow of exhaust gas, thereby increasing the flow coefficient of the exhaust gas introduced into the turbocharger, improving the efficiency of the turbocharger, and improving the engine performance.

Further, the connector 50 according to the exemplary embodiment of the present invention has the structure in which the outer side of the housing coupling part 52 is provided with a plurality of outer grooves 57 which increases the contact surface area with air, such that the heat exchange may be increased to reduce the temperature of the exhaust gas and the temperature of the exhaust gas may be reduced to reduce the stress and increase the durability.

Further, the connector 50 according to the exemplary embodiment of the present invention has the structure in which the inner stepped surface 56 is provided with the plurality of stepped surface holes 58, such that the deviation in thickness between the exhaust gas paths 53 is reduced, thereby relaxing the stress concentration due to the deviation in thickness, improving the thermal stress due to the exhaust gas, and reducing the weight.

According to the exemplary embodiments of the present invention, the connector has a 1 piece structure to reduce the number of components, save the costs, reduce the weight, improve the convenience of assembly and the productivity, increase the durability, increase the flow coefficient of the exhaust gas introduced into the turbocharger, thereby improving the efficiency of the turbocharger and the engine performance.

Further, it is possible to absorb the deformation (thermal fatigue) due to the thermal load of the high-temperature exhaust gas, thereby preventing the damage and increasing the durability and it is possible to improve the heat exchange by increasing the contact surface area with the air at the portion at which the high-temperature exhaust gases are joined so as to reduce the temperature of the exhaust gas, thereby reducing the stress and increasing the durability.

In addition, it is possible to reduce the deviation in thickness between the exhaust gas paths so as to relax the stress concentration due to the deviation in thickness, thereby improving the thermal stress due to the exhaust gases and reducing the weight.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A connector for coupling an exhaust manifold with a turbocharger housing, comprising:
   a manifold coupling part coupled with the exhaust manifold;
   a housing coupling part integrally coupled with an end of the manifold coupling part and coupled with the turbocharger housing; and
   a plurality of exhaust gas paths penetrating through the manifold coupling part and the housing coupling part,
   wherein the housing coupling part protrudes outwardly from the manifold coupling part, and
   wherein an outer stepped surface is formed between the manifold coupling part and the housing coupling part, the outer stepped surface contacting the exhaust manifold, and
   wherein an outer side of the housing coupling part is integrally provided with a plurality of outer grooves so as to reduce a temperature of the exhaust gas by increasing heat exchange depending on an increase in a surface area.

2. The connector according to claim 1,
   wherein an end of the housing coupling part is formed to an outer edge more protruding outwards than the exhaust gas path,
   wherein an inner stepped surface of the housing coupling part is disposed between the exhaust gas path and the outer edge, and
   wherein the inner stepped surface is provided with at least two exhaust gas paths which are spaced apart from each other.

3. The connector according to claim 2, wherein the inner stepped surface is provided with a plurality of stepped surface holes for relaxing stress concentration and reducing a weight by reducing a deviation in thickness between the exhaust gas paths so as to integrally penetrate through the housing coupling part and the manifold coupling part.

4. The connector according to claim 1, wherein the exhaust gas paths have a circular shape or an oval shape without a notch so as not to affect a flow of exhaust gas.

5. The connector according to claim 1,
   wherein the manifold coupling part is inserted into a space part between an inskin and an outskin of the exhaust manifold,
   wherein the inskin is welded to an inner circumferential surface of the exhaust gas path in a contact state therebetween,
   wherein the outskin is welded to an outer surface of the manifold coupling part in a contact state therebetween and an end of the outskin is coupled with the outer stepped surface in a contact state therebetween.

* * * * *